Oct. 3, 1950       A. F. FROUSSARD      2,524,381
MACHINE BEARING PROTECTING DEVICE
Filed May 28, 1945
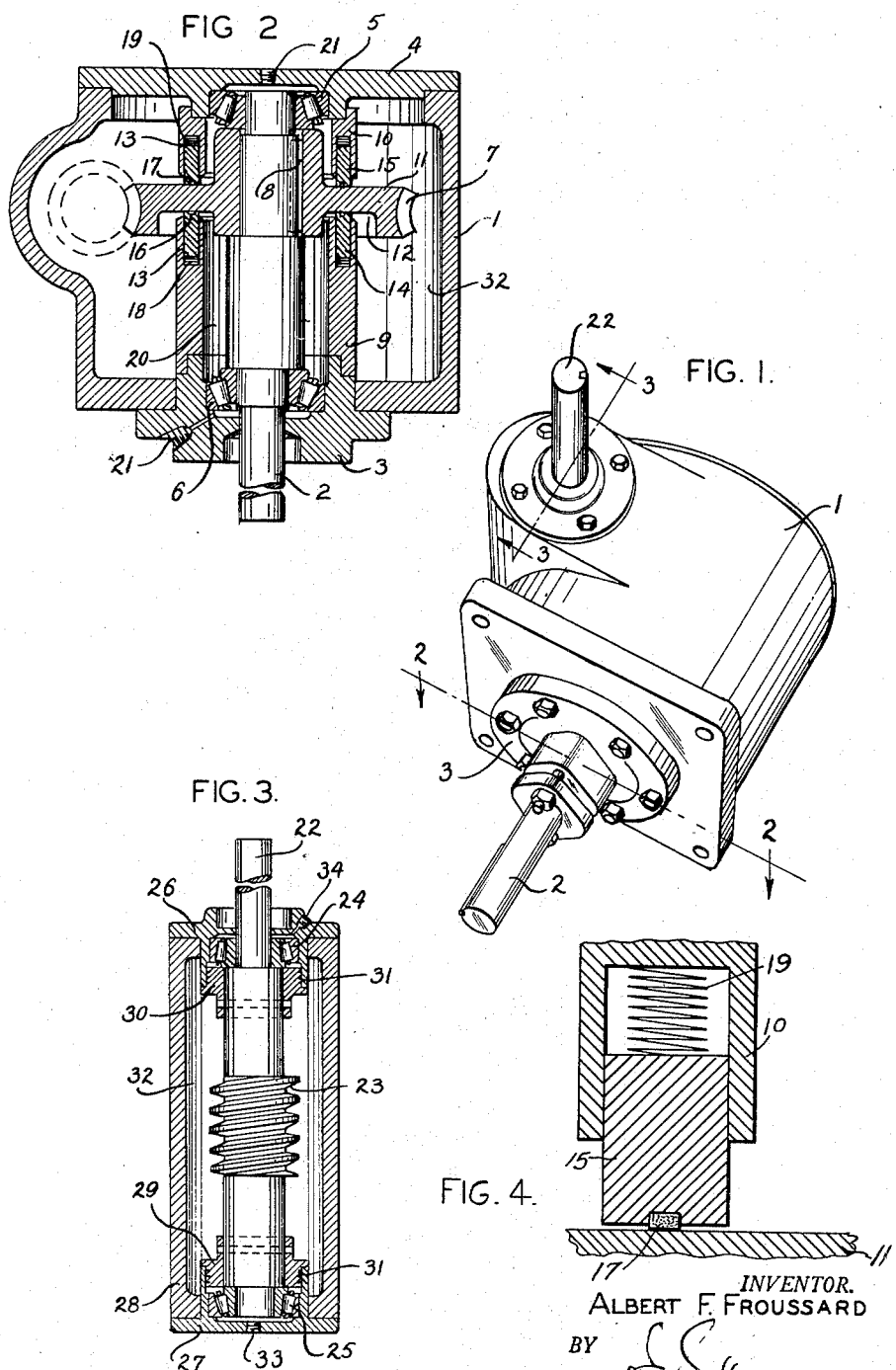
INVENTOR.
ALBERT F. FROUSSARD
BY
ATTORNEY.

Patented Oct. 3, 1950

2,524,381

UNITED STATES PATENT OFFICE 2,524,381

MACHINE BEARING PROTECTING DEVICE

Albert F. Froussard, St. Louis, Mo.

Application May 28, 1945, Serial No. 596,355

5 Claims. (Cl. 184—1)

This invention relates to machine tool sub-assemblies having adjacent chambers in which different types of lubricant are employed and its object is to provide means to prevent the transfer of lubricant and gear chips or other foreign matter from one chamber to the other.

In the drawings:

Figure 1 is a perspective view of a machine tool sub-assembly;

Figure 2 is a sectional view taken substantially along the line 2—2 of Figure 1;

Figure 3 is a sectional view taken substantially along the line 3—3 of Figure 1; and Figure 4 is an enlarged view of a portion of the mechanism shown in Figure 2.

Machine tool sub-assemblies and, in fact, any machine sub-assembly having rotating parts requires, for the best interests of efficient operation, that different types of equipment be lubricated with different grades or qualities of lubricant. Very often these different rotating parts are so organized that it is difficult to prevent the mingling of lubricants during the operation of the machine and when mingled, the wrong type of lubricant is very apt to weaken the other, thereby causing one or the other of the rotating or moving parts to become damaged by reason of improper lubrication.

The above objects and advantages are achieved in the structure set forth in the accompanying drawings in which numeral 1 shows a housing in which there are rotating parts including a driven shaft 2 extending therethrough in one direction and cooperating with a driving or second shaft arranged in the housing at an angle thereto. Driven shaft 2 in the instant disclosure receives power from the other shaft; is rotatably mounted in housing 1; and is retained in position in said housing 1 by means of bearing retainers 3 and 4, the latter constituting a closure for housing 1. Anti-friction bearing 5 is held in closure 4 and anti-friction bearing 6 is held in closure and bearing support 3. A worm wheel 7 receiving power is secured to shaft 2 by means of a key 8 or other appropriate mechanism.

Disposed within housing 1 is a sleeve 9 associated with the closure and bearing support 3. A second sleeve 10 is associated with closure 4 and the ends of sleeves 9 and 10 extend to within a very short distance of the flat surfaces 11 and 12 of the worm wheel 7. Each of sleeves 9 and 10 has a circular slot 13 therein into which sleeves 14 and 15 are telescopically fitted, as shown in Figure 2 of the drawings. The ends of the sleeves immediately adjacent surfaces 11 and 12 are equipped with wiper rings or seals 16 and 17, preferably graphite rings, which prevent the transfer of lubricant along surfaces 11 and 12 into another chamber in housing 1. Other functions of these rings are subsequently set forth. Springs 18 and 19 are inserted between the base of slots 13 in sleeves 9 and 10 and the sleeve inserts 14 and 15 in order that the wiper or seal elements 16 and 17 may be held in firm engagement with surfaces 11 and 12. These springs may be of any suitable type and are intended to apply a substantial pressure on sleeves 14 and 15, thereby applying considerable pressure to seals 16 and 17.

Bearings 5 and 6 are preferably lubricated with a type of lubricant known as "hard oil" or a lubricant which does not readily flow and is admitted to chamber 20 through ducts 21, each of which is customarily provided with a suitable lubricant nipple to enable lubricant to be admitted to chamber 20 under considerable pressure.

The upper portion of the housing has a driving shaft 22 therein with a worm 23 thereon rotatably supported in bearings 24 and 25 of the anti-friction type which are received in retainers 26 and 27, the latter being received within member 28 forming part of housing 1 in which shaft 22 is rotatably mounted. Worm 23 meshes with worm wheel 7 so that rotative movement may be transmitted from shaft 22 to shaft 2. The retainers 26 and 27 are provided with collar elements 29 and 30 secured to shaft 22 and have lubricant retainers 31 inserted therein which engage with sleeve extensions on the bearing retainers 26 and 27.

Lubricant of the type introduced into chamber 20 is likewise introduced into bearings 24 and 25 through apertures 33 and 34 by means of lubricant nipples well-known in the art which are intended to maintain the lubricant in the bearing chambers after admission thereto.

Chamber 32 in housing 1 is supplied with a suitable oil to enable the gears 23 and 7 to operate in an oil bath as is customary in the art. This oil has a much lower viscosity than the lubricant in chamber 20. The oils in the different chambers 20 and 32 are kept separated by the use of seals 16, 17 in the ring elements 14 and 15 during all periods of operation and thereby produce a more uniform operation and proper lubrication of each of the several portions thereof. The lubricant retainers 31 and the bearing holders and retainers 26 and 27 prevent the lubricant from entering chamber 32 from the supports for bearings 24 and 25. During operation chips, dust, and iron dust are dislodged from the gears. The several elements 16, 17, and 31 confine these chips to chamber 32.

Having fully described my invention, that which I claim as novel and desire to protect by Letters Patent of the United States is:

1. In a machine sub-assembly, a housing; a shaft rotatably mounted in said housing; a second shaft rotatably mounted in said housing; power transmitting means comprising a pair of gear elements in which one gear is mounted on each of said shafts and said gears meshing in order that motion may be transmitted from one shaft to the other; sleeve members surrounding one of said shafts; bearings in which said first shaft is rotatably mounted; movable sleeves in each of said sleeve members; lubricant seals in each of said movable sleeves engaging with the faces of the associated gear; and resilient means in each of said sleeves engaging said movable sleeves to urge the lubricant seals into engagement with said associated gear.

2. In a machine sub-assembly, a housing; a shaft rotatably mounted in said housing; sleeve elements in said housing telescopically and coaxially arranged with respect to said shaft to form a chamber about said shaft; a gear on said shaft; a second shaft rotatably mounted in said housing having a gear thereon meshing with the gear on said first shaft; and lubricant retainers in said sleeves engaging with said gear on said first shaft to prevent the flow of lubricant and other foreign matter from one chamber to the other.

3. In a machine assembly, a housing; a shaft rotatably mounted therein; a gear on said shaft; a second shaft mounted in said housing; a gear on said second shaft meshing with the gear on said first shaft, said housing having a chamber for an oil bath in which said gears operate; means to form a chamber about said first shaft comprising tubular members coaxial with said first mentioned shaft and sleeve members telescopically arranged with respect to said tubular members; and lubricant seals on said sleeve members engaging with the gear on said first shaft to prevent the transfer of oil and foreign matter from said first mentioned chamber to said second mentioned chamber.

4. In a machine assembly, a housing; a shaft having a motion transferring means thereon rotatably mounted in said housing; a second shaft having a motion transferring means thereon rotatably mounted in said housing, both of said motion transferring means constructed and arranged to transfer motion from one to the other, said housing forming a chamber for an oil bath in which one of said motion transferring means operates; means forming a chamber about one of said shafts including sleeve members operatively associated with the motion transferring means thereon; and lubricant seals in said sleeve members engaging said motion transferring means to prevent the transfer of oil and foreign matter from one chamber to the other.

5. In a machine assembly, a housing; a shaft having a motion transferring means thereon rotatably mounted in said housing; a second shaft having a motion transferring means thereon rotatably mounted in said housing, both of said motion transferring means constructed and arranged to transfer motion from one to the other, said housing forming a chamber for an oil bath in which one of said motion transferring means operates; means including sleeve elements concentrically arranged about one of said shafts to form a chamber; other sleeve elements telescopically arranged with respect to said sleeve elements; lubricant seals arranged in said other sleeves engageable with the motion transferring means on said shaft; and resilient means in said sleeve elements urging said seals into engagement with said motion transferring means to prevent the transfer of lubricant and foreign matter from one chamber to the other.

ALBERT F. FROUSSARD.

REFERENCES CITED

The following references are of record in the file of this patent:

UNITED STATES PATENTS

| Number | Name | Date |
|---|---|---|
| 1,851,076 | Ackerman | Mar. 29, 1932 |
| 2,135,477 | Griswold | Nov. 1, 1938 |
| 2,382,006 | Dusevoir | Aug. 14, 1945 |